Dec. 10, 1929.         R. J. WENSLEY ET AL         1,739,109
                      MOTOR CONTROL SYSTEM
                      Filed April 12, 1926
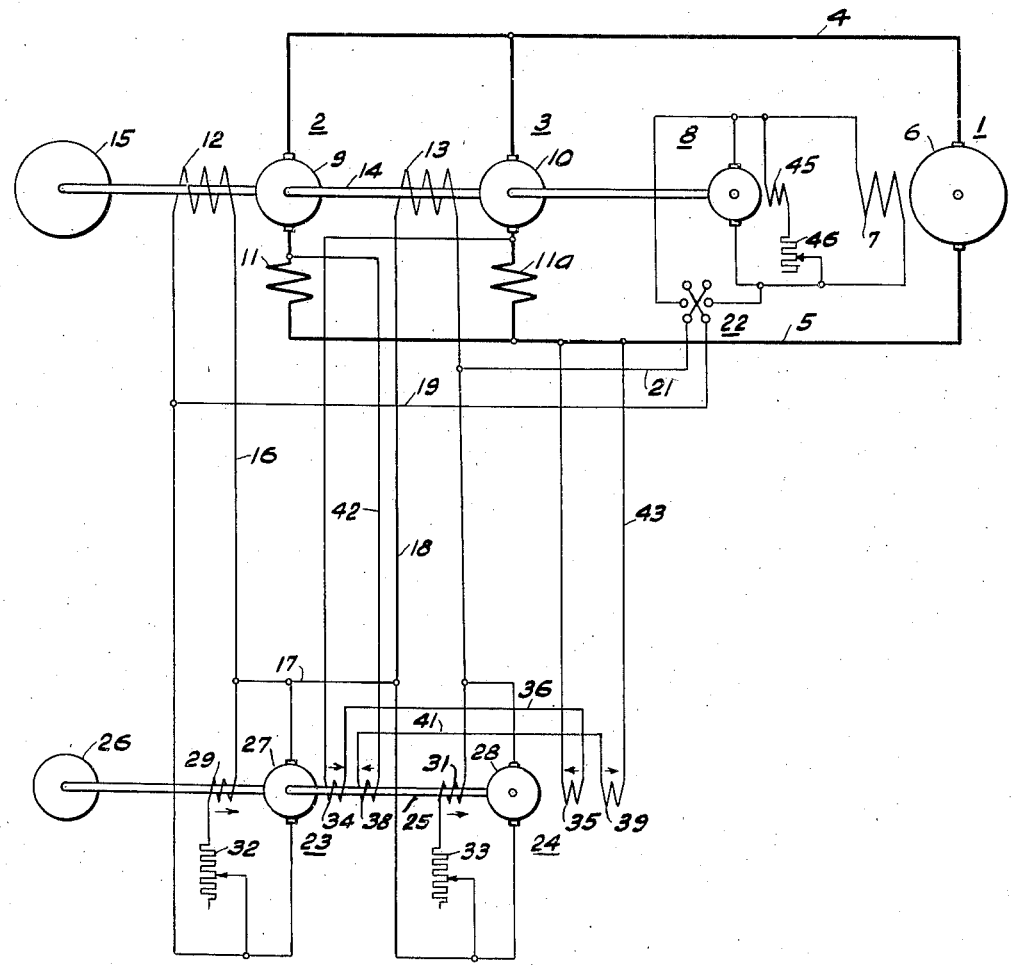
WITNESSES:
E. A. McCloskey
J. E. Hardy
INVENTORS
Roy J. Wensley &
M. J. Wohlgemuth
BY
Wesley G. Carr
ATTORNEY Patented Dec. 10, 1929

1,739,109

UNITED STATES PATENT OFFICE

ROY J. WENSLEY, OF EDGEWOOD, AND MELVILLE J. WOHLGEMUTH, OF PITTSBURGH, PENNSYLVANIA, ASSIGNORS TO WESTINGHOUSE ELECTRIC AND MANUFACTURING COMPANY, A CORPORATION OF PENNSYLVANIA

MOTOR-CONTROL SYSTEM

Application filed April 12, 1926. Serial No. 101,251.

Our invention relates to systems of motor control and more particularly to systems employed with reversing-mill motors of large capacity.

In the operation of heavy reversing-mill motors, it is usually desirable to control the operation of the motor by controlling the voltage of the generator supplying power thereto, as in the well-known Ward Leonard system, and to reverse the direction of operation of the motor by reversing the direction of excitation of the generator, thereby reversing the direction of current flow through the generator and motor. The operation of such a system involves heavy power demands of short duration as the motor speed builds up in each direction. It has been found desirable to use a pair of generators mechanically connected together and a fly-wheel for supplying part of the energy during such power demand periods.

It has also been found that the operation of the fly-wheel set at a high speed is more economical than at low speeds and that two comparatively small generators operating at a relatively high speed are more efficient than a single generator of larger capacity operating at a lower speed. However, the operation of two generators connected in parallel-circuit relation in such a set may result in an unbalanced load between the generators, unless means is provided for maintaining an equal load on the two machines.

An object of our invention is, therefore, to provide a system of motor control of the above-indicated character that is economical and efficient in operation.

Another object of our invention is to provide such a system with means for balancing the load on the generators.

In practicing our invention, we make use of a fly-wheel generator set having a pair of generators connected in parallel-circuit relation to each other, and to the reversing-mill motor. The generators are provided with separately excited field windings that are connected in series circuit relation with each other, and each generator is also provided with a series-field winding. A pair of auxiliary exciters of relatively small capacity are provided, one being connected to each of the separately excited generator-field windings.

The auxiliary exciters operate to boost or buck the normal excitation of the generator field windings, as may be required to maintain the proper division of load between the generators. Each auxiliary exciter is provided with a shunt-field winding and with a pair of differentially-related field windings, the like differential windings of the two auxiliary generators being connected in series relation with each other and in shunt relation to one of the generator series-field windings.

Our invention will be better understood by reference to the accompanying drawing, in which the single figure is a diagrammatic view of circuits and apparatus employed in an embodiment of our invention.

Referring to the drawing, a reversing-mill motor 1 is connected to a pair of generators 2 and 3 by means of conductors 4 and 5. The motor 1 comprises an armature winding 6 and a field winding 7 that is connected to be energized from an exciter generator 8. The generators 2 and 3 are respectively provided with armature windings 9 and 10 that are connected in parallel-circuit relation, and with field windings 12 and 13. Series-field windings 11 and 11a are also provided for the generators 2 and 3, respectively.

The armature windings 9 and 10 are mounted upon a shaft 14 that is provided with a fly-wheel 15 and to which the exciter generator 8 may also be connected. The field windings 12 and 13 are connected in series circuit relation by means of conductors 16, 17 and 18, and by means of conductors 19 and 21, and through a reversing switch 22, to the exciter generator 8.

A pair of auxiliary generators or exciters 23 and 24 may be connected by means of a shaft 25 to a prime mover 26. The exciters 23 and 24 respectively comprise armature windings 27 and 28, and shunt field windings 29 and 31. In circuit with the field windings 29 and 31, respectively, rheostats 32 and 33 are connected.

The auxiliary exciters 23 and 24 are also respectively provided with field windings 34 and 35, which are connected in series relation with each other by means of conductor 36, and in shunt relation to the interpole or series-field winding 11a of the generator 3. The auxiliary exciters 23 and 24 are further provided with field windings 38 and 39, which are respectively differentially related to the field windings 34 and 35 and are connected in series-circuit relation by means of conductor 41, and by means of conductors 42 and 43 are connected in shunt relation to the interpole-field winding 11 of the generator 2. The exciter generator 8 is provided with a shunt-field winding 45, which is connected in series relation with a rheostat 46 for controlling the exciter voltage and, consequently, the voltage of the generators 2 and 3 that is impressed upon the motor 1.

The operation of the system is as follows: The voltage impressed upon the motor 1 is controlled by varying the voltage of the exciter generator 8 by means of the rheostat 46, and the direction of operation of the motor 1 is reversed by reversing the direction of electromotive force impressed upon the motor armature. This result is accomplished by reversing the direction of excitation of the field windings 12 and 13 of the generators 2 and 3 by means of the reversing switch 22.

The auxiliary generators 23 and 24, which may be of about 10% of the capacity required for the field windings 12 and 13, of the generators 2 and 3, respectively, are shunt excited from, that is, are connected directly across, the generator-field windings 12 and 13, respectively, and are differentially excited in accordance with the voltage drops across the interpole or series field windings 11 and 11a of the generators 2 and 3, respectively. The field windings 34 and 35 are thus excited in proportion to the load on the generator 3 and the differentially-related field windings 38 and 39 are excited in proportion to the load on the generator 2.

The excitation of the shunt-field windings 29 and 31 may be adjusted manually by means of the rheostats 32 and 33, respectively, to the point of minimum current flow from the auxiliary generators 23 and 24, which point corresponds to a generated electromotive force of the auxiliary generators, that is, in accordance with the normal voltage drop across the generator-field windings 12 and 13.

So long as the current flow from the generators 2 and 3, through their respective series-field windings 11 and 11a, are equal, the excitations of the field windings 38 and 39 and of the differentially-related field windings 34 and 35 will be equal or will neutralize each other. Should the generator 2 take an undue proportion of the load, current flowing through the field windings 38 and 39 will increase in the direction indicated by the arrows and the voltage of the exciter 23 will be reduced, while the voltage of the exciter 24 will be increased, by reason of the action of their differentially-related field windings. It will be noted by reference to the arrows that when the current in the field windings 38 and 39 is greater than that in field windings 34 and 35 the resultant flux from the field windings 34 and 38 opposes the flux from the field winding 29, while the resultant flux from the field windings 35 and 39 is in the same direction as that from the field winding 31. The effect of this action will be to decrease the excitation of field winding 12 and increase the excitation of field winding 13, thus restoring proper division of load between the generators 2 and 3. Conversely, if the generator 3 takes an undue share of the load, the exciters 23 and 24 will act to reduce the excitation of the field winding 13 and increase the excitation of the field winding 12.

Many modifications may be made in the circuits and apparatus disclosed in this embodiment of our invention without departing from the spirit thereof, and we do not wish to be limited other than by the scope of the appended claims.

We claim as our invention:

1. In combination, a direct-current motor and two generators therefor connected in parallel-circuit relation, an exciter armature for each generator, a pair of differentially-related field windings for each exciter armature, and means for energizing said field windings in accordance with the loads on said generators.

2. In combination, a pair of generators each having a field winding, said field windings being connected in series circuit relation, a source of electrical energy for energizing said field windings, a pair of exciter armatures respectively connected to said field windings, and means controlled by the current of said generators for regulating the voltages of said exciter armatures to balance the load on said generators.

3. In combination, a pair of generators comprising field windings connected in series-circuit relation, a pair of exciter armatures respectively connected to said field windings, and means for differentially varying the voltages of said exciter armatures to balance the load on said generators.

4. In combination, a pair of generators mechanically connected together and electrically connected in parallel-circuit relation, a pair of exciter armatures therefor mechanically connected together, said generators comprising field windings connected in series-circuit relation, said exciter armatures being respectively connected to said field windings, and means for differentially varying the voltages of said exciter armatures to balance the load on said generators.

5. In combination, a pair of generators comprising field windings connected in series-circuit relation, a pair of exciters respectively connected to said field windings, each of said exciters comprising a pair of differentially-related field windings, and means for energizing said field windings in accordance with the respective loads of said generators.

In testimony whereof, we have hereunto subscribed our names this 30th day of March, 1926.

ROY J. WENSLEY.
MELVILLE J. WOHLGEMUTH.